No. 657,136. Patented Sept. 4, 1900.
A. L. SCHULTZ.
COMBINATION TOOL.
(Application filed Oct. 30, 1899.)
(No Model.) 2 Sheets—Sheet 1.
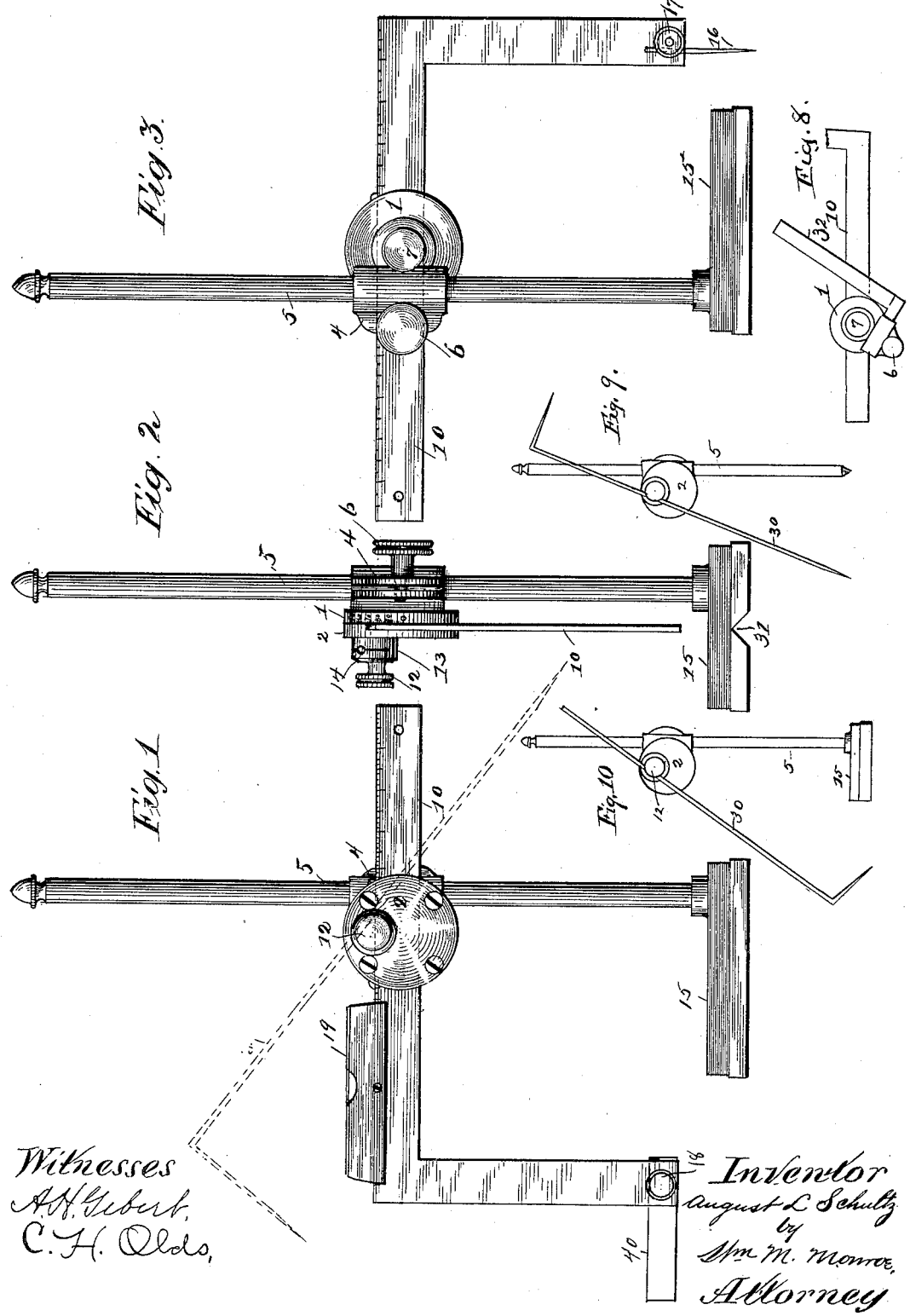

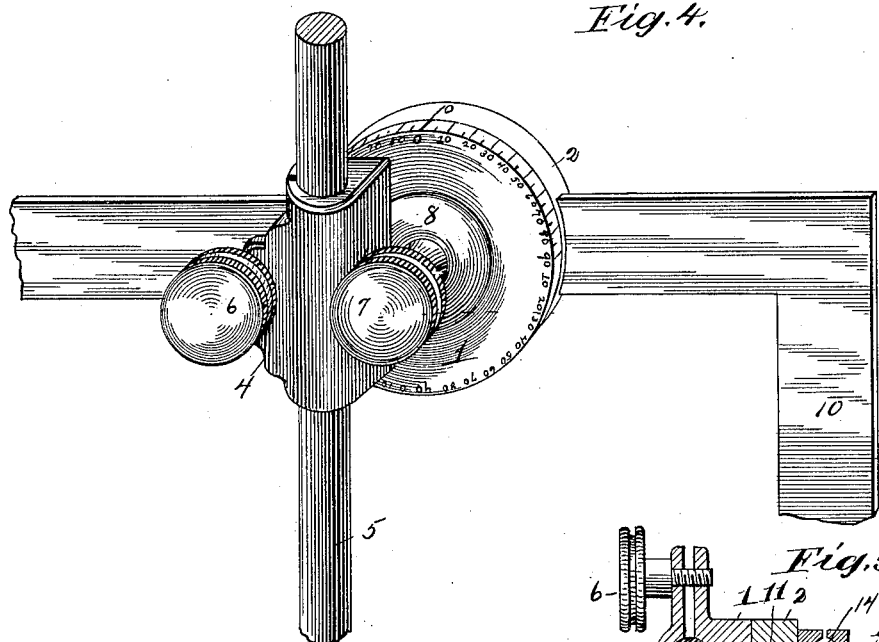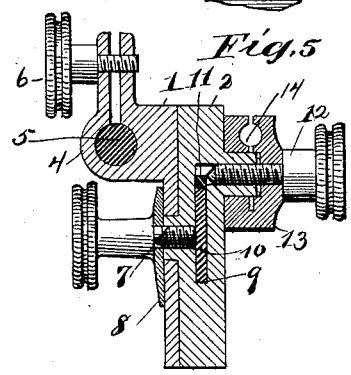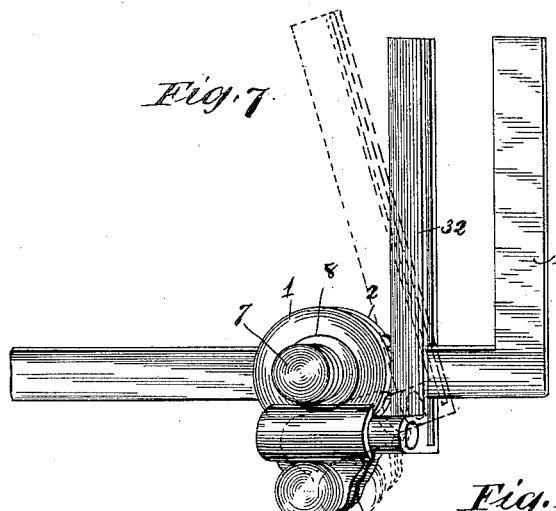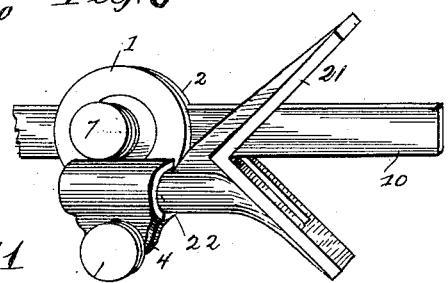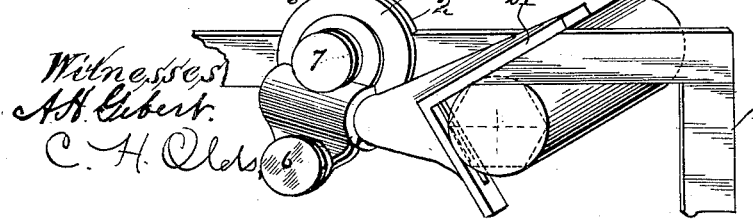

UNITED STATES PATENT OFFICE.

AUGUST L. SCHULTZ, OF CLEVELAND, OHIO.

COMBINATION-TOOL.

SPECIFICATION forming part of Letters Patent No. 657,136, dated September 4, 1900.

Application filed October 30, 1899. Serial No. 735,203. (No model.)

*To all whom it may concern:*

Be it known that I, AUGUST L. SCHULTZ, a citizen of the United States, and a resident of Cleveland, county of Cuyahoga, State of Ohio, have invented certain new and useful Improvements in Combination-Tools, of which I hereby declare the following to be a full, clear, and exact description, such as will enable others skilled in the art to which it appertains to make and use the same.

My invention relates to improvements in machinists' tools; and the objects are to provide means for accomplishing in a single portable tool of convenient shape and size the various functions of a surface gage, a square and bevel protractor, a center-gage, a trammel-head, or a compass and level, and it can equally be adapted to determining the exact vertical or horizontal alinements of shafting or can be used to measure the angular relations of different surfaces in work upon the planer or shaper or for other analogous uses.

My invention consists, primarily, in the graduated clamping-head and accessories thereto and in the material features and details of construction and combinations of parts, as hereinafter described, shown in the accompanying drawings, and specifically pointed out in the claim.

In the accompanying drawings, Figures 1, 2, and 3 are front, edge, and rear views of the device employed with the square to measure angles and for other uses hereinafter described. Fig. 4 is an enlarged view of the graduated head. Fig. 5 is a central section through the head. The square in this figure is shown in the position at right angles to that shown in Fig. 4. Fig. 6 is a detail of center-gage. Fig. 7 shows square calipers and taper gage. Fig. 8 shows a bevel protractor; Fig. 9, a compass; Fig. 10, a surface gage as in common use. Fig. 11 shows another use of center-gage.

In the views the essential feature of the device is the clamping-head. This head is, as shown, composed of two adjacent disks 1 and 2, one of which, 1, is graduated on at least half of its periphery, and the other is provided with marks at the zero-points for adjustment. One of these disks 1 is provided with the clamping-lug 4, through which passes the standard 5, secured therein by means of the thumb-screw 6. The disks themselves are clamped adjustably together by means of the central thumb-screw 7, provided with washer 8. The disk 2 is provided with the rectangular opening 9, which passes diametrically through the disk and which receives the graduated square 10. The square is clamped in position by means of the gib 11 and thumb-screw 12. This thumb-screw also holds the slotted sleeve 13, which is drilled at 14 to secure a needle-gage 30, by means of which a surface gage is obtained adjustable by means of the graduated arcs. It will readily be seen that the square and needle are both clamped singly or simultaneously by means of the screw 12. This head can be mounted, as shown in Figs. 1, 2, and 3, upon a surface plate, as at 15. This plate can be placed upon the bed of a shaper or lathe, and by means of the graduated disks and projecting extremity of the square the relative angles of any adjacent surfaces can be determined with the greatest ease. By attaching a small needle, as at 16, to the square a surface gage can be obtained for all common uses, and with the addition of the arm 40 it can be used as a depth-gage or gage for all interior surfaces. This is shown attached by means of a perforated screw 17 and nut 18. A pen or pencil can be substituted for the point 16. A notch 31, centered under the standard, can be made in the surface plate 15 and a level 19 attached to either the horizontal or vertical edge of the square. The notch can then be laid upon a vertical or horizontal shaft, and the degree of variation from true alinement can be read upon the graduated disks and the shaft placed in true position.

In Fig. 7 is seen a slotted rider arm or attachment 32, set into the clamp for the standard, by means of which square calipers are obtained when the disks are set to zero. When angles are to be measured, or tapers, the inclination can be given to the arm 32 by loosening the clamping-screw of the disks, and the tapered shaft or pin being inserted the angle can then be read on the disks.

In Fig. 6 is seen another variation in the use of the device, wherein 21 is a center-gage riding upon the square and provided with a wrist 22, which is set into the clamp of the graduated head, a large number of angular variations can be obtained and accurately read, and by means of which square, hexagon, or other shapes can be marked readily upon the extremity of a shaft. As seen in Fig. 11, a hexagon is drawn on the end of the shaft.

In Fig. 8 is seen the adaptation of the arm 32 to use as a common protractor, by means of which angles can readily be measured in all sorts of positions.

The advantages of this device are obvious, since with the single graduated head and a few accessories a large variety of work can be done and a large variety of angles measured and described.

Having described my invention, what I claim as new, and desire to secure by Letters Patent, is—

In a tool for the purpose described, the combination of two adjacent disks graduated upon their peripheries, one of said disks being provided with a rectangular opening and the other with a clamping-lug to secure accessory tools thereto, with a square adapted to pass through said opening, a clamping-screw therefor, a slotted sleeve about said screw adapted to receive a needle-gage, and a central clamping-screw for the disks, substantially as described.

In testimony whereof I have signed my name to this specification in the presence of two subscribing witnesses.

AUGUST L. SCHULTZ.

Witnesses:
AMANZ MAEDER,
WM. C. HARTMANN.